UNITED STATES PATENT OFFICE.

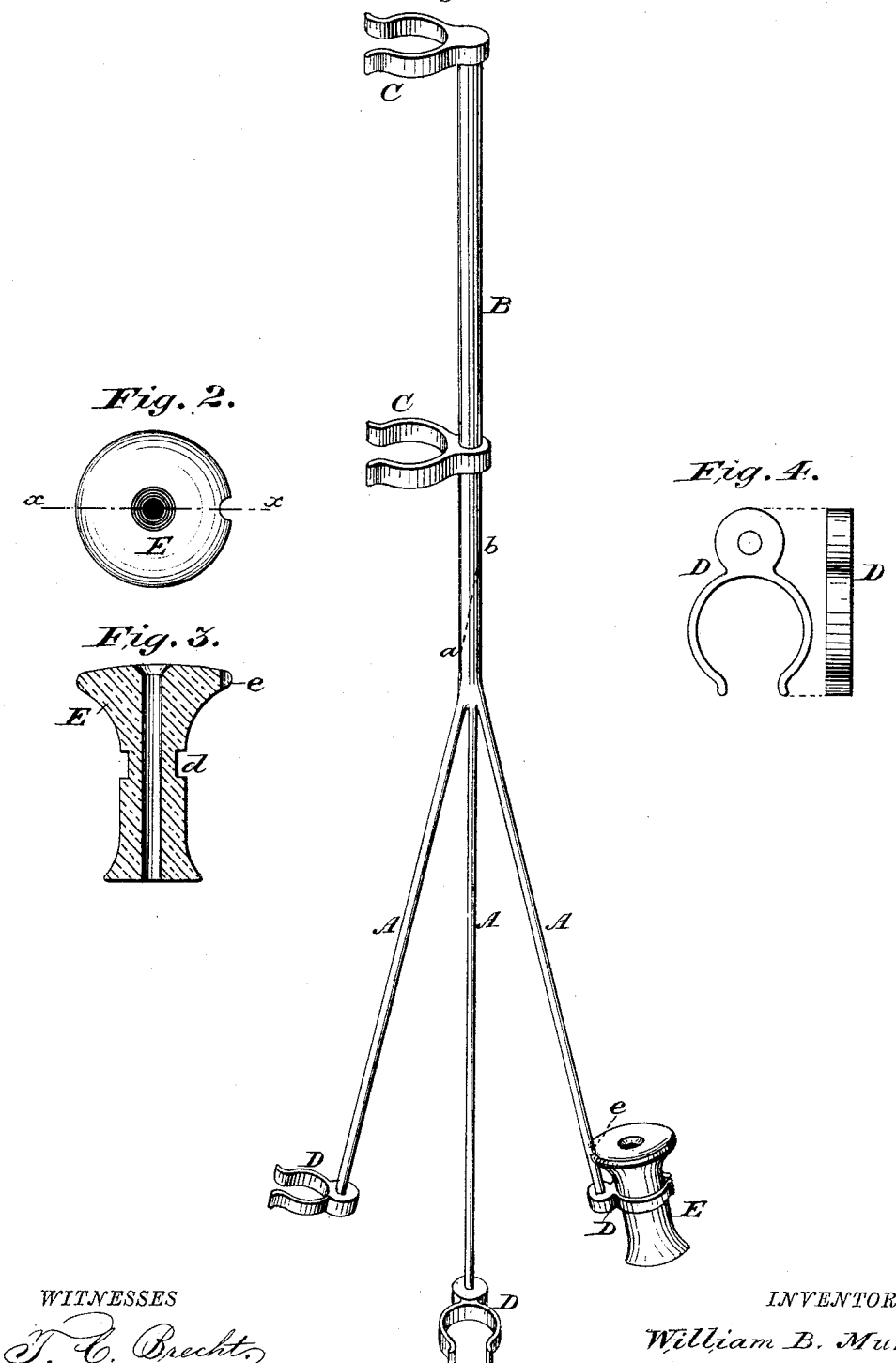

WILLIAM B. MUNN, OF COLLINGSWOOD, NEW JERSEY.

STAND FOR LIGHTNING-RODS.

SPECIFICATION forming part of Letters Patent No. 263,423, dated August 29, 1882.

Application filed February 1, 1882. (No model.)

*To all whom it may concern:*

Be it known that I, WILLIAM B. MUNN, a citizen of the United States, residing at Collingswood, in the county of Camden and State of New Jersey, have invented new and useful Improvements in Stands for Lightning-Rods, of which the following is a specification.

My invention relates to certain improvements in stands or supports for lightning-rods. Prior to my invention the stands or supports for lightning-rods have been made of metal and the feet secured to the peak of a roof by nails or screws and the insulation provided at the points of contact between the rod and stand. Imperfect insulation at such points renders it quite dangerous to use the stand described.

The object of my invention is to provide a simple and economic stand which shall be free from the objection just described, and which shall be effective in protecting the roof; and with this object in view my invention consists broadly of a stand or support the feet or resting-points of which are connected to or surround insulating-knobs, as will be hereinafter more fully set forth; and my invention further consists of the details of construction described and specifically claimed.

In order that those skilled in the art to which my invention appertains may know how to make and use the same, I will proceed to describe its construction and the manner in which I use the same, referring by letters to the accompanying drawings, in which—

Figure 1 is a perspective view of one of my improved stands with one of its feet equipped with the insulator-knob, the other two left without to more fully illustrate one method of connection between the feet and the insulators. Fig. 2 is a top view of an insulator especially designed for use in connection with my stand; Fig. 3, a central vertical section at the line $x$ $x$ of Fig. 2, and Fig. 4 a plan and edge view of the brackets used at the ends of the stand.

Similar letters indicate like parts in the several figures of the drawings.

The lower portion of the stand consists of a tripod, consisting of the legs A, converging and joined at the top, and adapted to be joined by welding with a wrought-iron stem, B, as shown by dotted line $a$ $b$. This stem B is provided at its top and at any other suitable point or points below with malleable-iron brackets C, which are cast around the stem in the manner well known for securing cast metal to wrought-iron. The lower ends of the legs A of the tripod are secured by rivets or otherwise to brackets or feet D, composed of malleable iron or other suitable metal adapted to be bent or compressed around the barrel of the insulator knobs or spools E.

In order to secure rigidity of connection between the feet D and the insulators E, I form the latter with a circumferential groove or channel, $d$, adapted to receive the arms of the brackets, and at the top portion of the insulator I provide a vertical notch or channel, $e$, adapted to partially surround or embrace the lower portion of the leg A of the tripod.

In applying the insulators I place them within the arms of the feet D, and then compress or squeeze said arms firmly into the circumferential channel $d$, at the same time taking care to properly locate the lower portion of the leg A into its seat within the notch $e$ in the top edge of the insulator. The insulators are provided with a central hole adapted to receive a securing nail or screw, by means of which the stand is connected to the roof.

It will be observed that with my improved stand no occasion exists for any insulation of the rod from the stem B and brackets C, and that the latter may be firmly pinched or pressed around the rod, thus avoiding any unnecessary vibration or noisy rattling of the latter, and that no accident is likely to ensue from the neglect to introduce insulators in the brackets C as at present used, or from the accidental displacement of the same.

What I claim as new, and desire to secure by Letters Patent, is—

1. A lightning-rod stand consisting of the stem B, provided with means for holding or grasping the rod, and supporting-legs A, provided at their lower extremities with insulators E, substantially as shown and described.

2. The stand B, provided with legs A, having at their lower extremities brackets, in combination with the insulators E, formed with circumferential channel $d$ to receive the arms of the brackets, and having an axial aperture whereby it may be attached to the object or structure to be protected, substantially as hereinbefore set forth.

3. In combination with a stand provided with the legs A, the insulators E, provided with a circumferential groove or channel, *d*, and a vertical notch, *e*, substantially as and for the purpose set forth.

In testimony whereof I have hereunto set my hand in the presence of two subscribing witnesses.

WILLIAM B. MUNN.

Witnesses:
WM. H. BATES,
B. F. MORSELL.